United States Patent [19]

Bowen

[11] Patent Number: 4,968,113

[45] Date of Patent: Nov. 6, 1990

[54] OPTICAL FIBER NUT

[75] Inventor: Terry P. Bowen, Etters, Pa.

[73] Assignee: AMP Incorporated, Harrisburg, Pa.

[21] Appl. No.: 333,514

[22] Filed: Apr. 5, 1989

[51] Int. Cl.$^5$ .............................................. G02B 6/36
[52] U.S. Cl. ............................... 350/96.20; 350/96.15
[58] Field of Search ............... 350/96.15, 96.16, 96.18, 350/96.20, 96.21

[56] References Cited

U.S. PATENT DOCUMENTS

| | | | |
|---|---|---|---|
| 3,883,223 | 5/1975 | Hudson | 350/96.16 |
| 4,167,303 | 9/1979 | Bowen et al. | 350/96.21 |
| 4,274,706 | 6/1981 | Tangonan | 350/96.19 |
| 4,329,017 | 5/1982 | Kapany et al. | 350/96.15 |
| 4,440,469 | 4/1984 | Schumacher | 350/96.20 |
| 4,477,714 | 10/1984 | Bowen et al. | 350/96.21 |
| 4,479,697 | 10/1984 | Kapany et al. | 350/96.18 |
| 4,583,820 | 4/1986 | Fiamand et al. | 350/96.19 |
| 4,675,860 | 6/1987 | Laude et al. | 370/3 |
| 4,684,161 | 8/1987 | Egner et al. | 294/1.1 |
| 4,703,472 | 10/1987 | Blumentritt et al. | 370/3 |
| 4,717,234 | 1/1988 | Barlow et al. | 350/96.21 |
| 4,722,582 | 2/1988 | Modone et al. | 350/96.15 |
| 4,735,477 | 4/1988 | Bowen | 350/96.21 X |
| 4,762,389 | 8/1988 | Kaihara | 350/96.21 |
| 4,763,978 | 8/1988 | Courtney-Pratt et al. | 350/96.18 |

Primary Examiner—John D. Lee

[57] ABSTRACT

A multi-piece, yet easily assembled optical fiber connector (10) for optically coupling side-by-side optical fibers (60, 62) comprises a housing assembly (12) and a coupling member (14) which interconnect with each other. The housing assembly (12) and coupling member (14) include axial bores (20, 36) which align with each other, the axial bore (20) of the housing assembly (12) terminating in a spherical reflecting surface (27). The optical fiber connector (10) includes a main ferrule (16) which is received within the axial bores (20, 36) of the housing assembly (12) and the coupling member (14). The main ferrule (16) includes an axial bore (44) which terminates in an aperture (46). The main ferrule (16) further includes an annular flange (48) which cooperates with inner shoulders (50) of the housing assembly (12) and the coupling member (14) to space the aperture (46) in the 1:1 imaging plane of the spherical reflecting surface (27). The connector (10) further comprises a second, inner ferrule (18) similar to main ferrule (16) which is received in the axial bore (44) of the main ferrule (16) in an interference fit. The inner ferrule (18) also includes an axial bore (56) terminating in an aperture (58). Side-by-side optical fibers (60, 62) which pass through the aperture (58) of inner ferrule (18) and terminate at the aperture (46) of main ferrule (16) are optically coupled to each other.

7 Claims, 2 Drawing Sheets

OPTICAL FIBER NUT

BACKGROUND OF THE INVENTION

The invention relates to an optical fiber connector in the form of a coupling nut. More specifically, the invention relates to an optical fiber connector which receives and terminates two side-by-side optical fibers. The connector comprises a fiber nut housing which includes a spherical mirror so that the light emission from one of the side-by-side fibers is coupled into the other side-by-side fiber.

Many optical fiber connectors which optically connect one optical fiber to another are known to persons of skill in the art. In most of these connectors, the transmission core of a first optical fiber is axially aligned with that of a second optical fiber and a polished end surface of the first optical fiber is caused to abut against a polished end surface of the second optical fiber. In many cases, a ferrule is applied to the end of each of the fibers. A coupling member receives the ferrules from opposite sides and ensures that the two fibers are axially aligned and that their end surfaces abut against each other. Examples of such connectors are disclosed in U.S. Pat. Nos. 4,167,303 and 4,477,146.

In recent years, optical fiber connectors of a different sort have been developed for optically coupling one optical fiber to another. These newer connectors align two or more optical fibers in a side-by-side relationship and employ a mirror to couple optically the output from one optical fiber to one or more other parallel optical fibers. U.S. Pat. No. 4,167,303, commonly assigned with the present application, discloses an optical fiber splice terminal which includes a housing assembly to receive prepared end sections of two optical fibers in a common input section. The housing assembly holds both optical fibers securely in an aligned side-by-side relationship such that the end faces are adjacent a clear optical element. The optical element includes a reflective surface of parabolic shape. Thereby, light emitted from the end face of one fiber is reflected into the end face of the other fiber in a focused beam.

In U.S. Pat. No. 4,763,978, an optical fiber connector is disclosed comprising a plurality of spaced-apart optical fiber receiving holes formed at one end of the connector, and a spherical mirror formed at an opposite end of the connector. The fiber receiving holes are disposed on opposite sides of the principal axis of the spherical mirror. When light is emitted from the end face of an optical fiber inserted into one of the holes, the light impinges on the mirror and is reflected into the end face of an optical fiber inserted into another hole symmetrically disposed with respect to the principal axis.

The optical fiber connector of U.S. Pat. No. 4,763,978 has several drawbacks. The connector of this patent is a one-piece construction. Once the fibers are inserted into their respective holes and the connector is assembled, no means are provided for disassembling the connector. For example, it may be desirable at some point to disassemble the connector and to replace the spherical mirror with one of different reflectivity to attenuate the emitted light. Thus, the one-piece construction limits the flexibility of the connector. Moreover, no special means are provided to prevent skewing of the fibers inserted into the holes. Thus, the side-by-side fibers may become misaligned with respect to each other and with respect to the principal axis.

Other patents which disclose devices that use a mirror to optically couple the output from side-by-side optical fibers include the following U.S. Pat. Nos. 3,883,223; 4,274,706; 4,329,017; 4,583,820; 4,675,860; 4,703,472; and 4,722,582.

SUMMARY OF THE INVENTION

The present invention is a fiber nut connector which optically couples two side-by-side optical fibers without the need for any elaborate alignment or centering procedures or equipment therefor. The inventive fiber nut connector makes use of a spherical mirror A 1:1 imaging plane of a spherical mirror may be defined as the plane which includes the center of curvature of the spherical mirror and which is perpendicular to the optical axis of the mirror. The inventive fiber nut connector makes use of the fact that a light source located in the 1:1 imaging plane and slightly displaced from the center of curvature is imaged to a symmetrical location with respect to the center of curvature in the 1:1 imaging plane.

The inventive fiber nut connector comprises a housing assembly and a coupling member for receiving the side-by-side optical fibers The housing assembly and the coupling member include interconnecting means, for example, threading means, whereby they are interconnected. The coupling member includes a through-going axial bore, while the housing assembly includes an axial bore which terminates in a cavity, the back surface of which comprises a spherical mirror.

The inventive fiber nut connector further includes a main ferrule which is received within the axial bore of the housing assembly and the coupling member. The main ferrule has a nose portion and an axial bore which terminates in an aperture at the tip of the nose portion. Stripped side-by-side optical fibers pass through the axial bore of the main ferrule and terminate at the aperture in the nose portion. When the main ferrule is inserted into the axial bores of the housing assembly and the coupling member, and the housing assembly and coupling member are interconnected, the aperture in the nose portion is automatically located in the 1:1 imaging plane of the spherical mirror. Thus, the light emitted from the end face of one of the side-by-side optical fibers will be reflected by the spherical mirror and will impinge upon the end face of the other optical fiber.

It is a feature of the invention that the main ferrule includes an annular flange behind its nose portion. This annular flange abuts against an inner shoulder of the housing assembly to accurately space the aperture of the main ferrule from the spherical mirror so that the aperture is located at the 1:1 imaging plane. It is another feature of the invention that the nose portion of the main ferrule is received by the inner walls of the housing assembly's axial bore in an interference fit. This prevents side-to-side slippage of the optical fibers and aids in aligning the optical fibers with respect to the spherical mirror.

In an embodiment of the invention, a second, inner ferrule also having an axial bore and a nose portion, is provided. The inner ferrule has an aperture at the tip of its nose portion. The inner ferrule is received within the axial bore of the first main ferrule in an interference fit so that the apertures of the two ferrules are spaced apart from each other. The stripped optical fibers first pass through the axial bore and the aperture of the inner ferrule, and then through the axial bore of the main ferrule, terminating at the aperture of the main ferrule. Each of the apertures of the inner ferrule and the main ferrule, being spaced apart, serve as separate support points for the side-by-side fibers and help prevent skewing of the fibers.

It is an advantage of the inventive optical fiber nut connector that it is constructed out of more than one piece, thus providing versatility. Yet the connector is easily assembled even in the field without any special tools. It is another advantage of the inventive optical fiber nut connector that it can be easily disassembled when desired. It is yet another advantage of the inventive fiber nut connector that the spacing and alignment requirements are automatically satisfied when the device is assembled.

DETAILED DESCRIPTION OF AN EMBODIMENT

Figure 1:
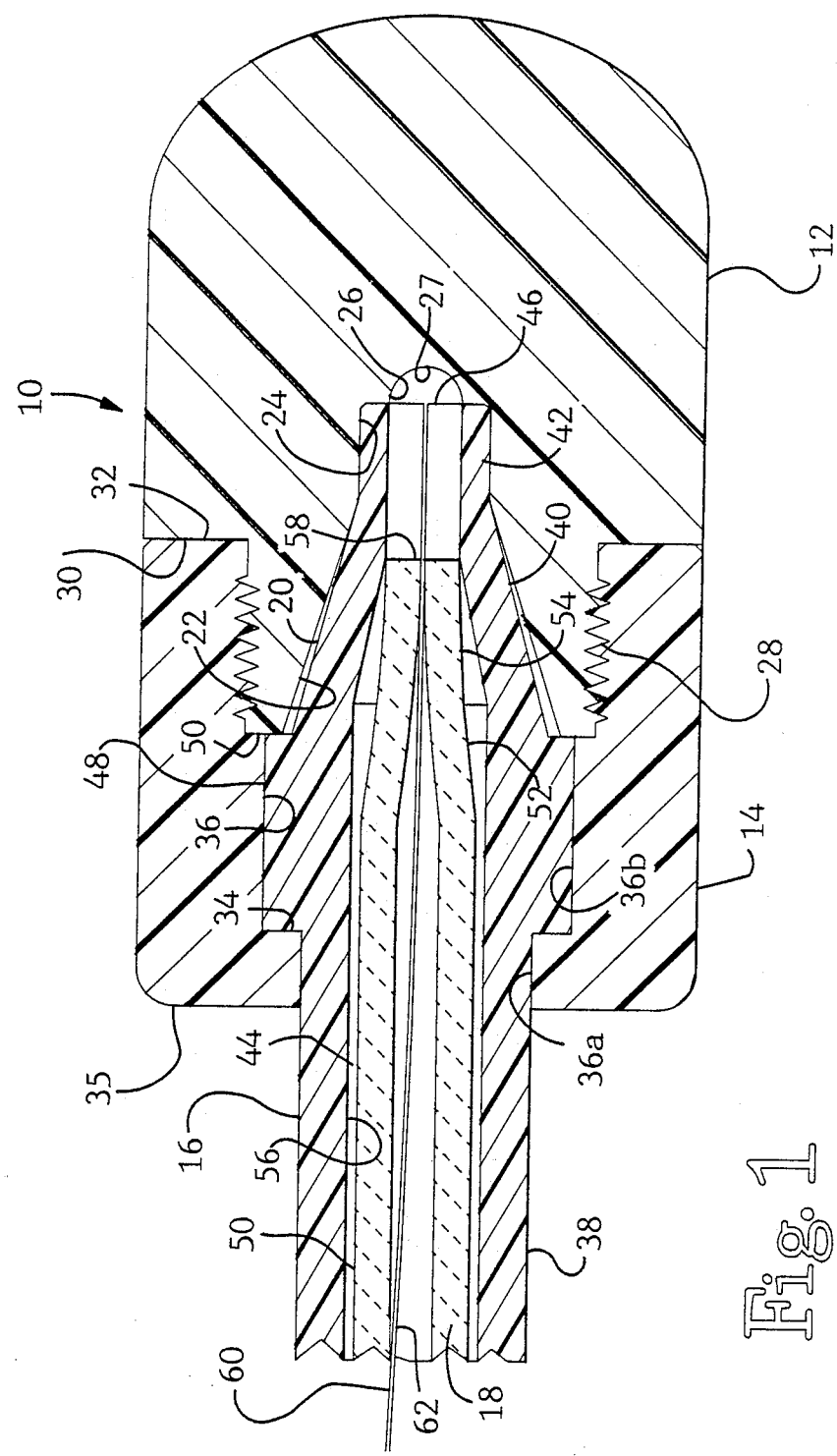
FIG. 1 illustrates the inventive optical fiber connector in cross-section.
Figure 4:
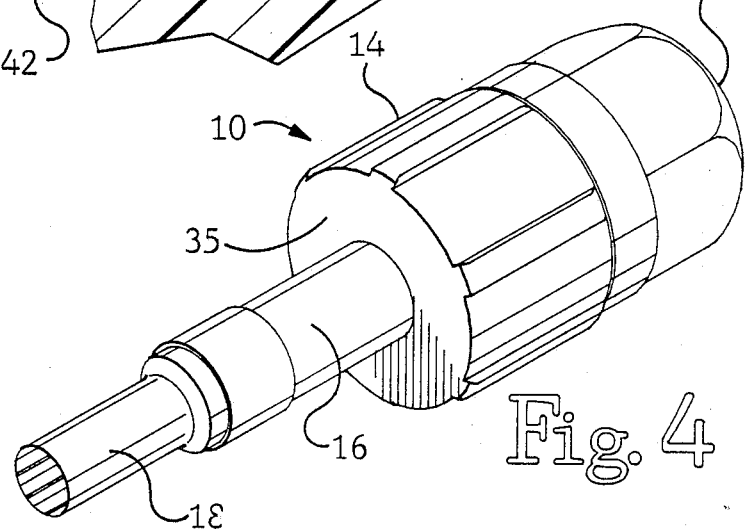
FIG. 4 is a perspective view of the assembled optical fiber connector.

Referring to FIGS. 1 and 4, an optical fiber connector 10 according to the invention is illustrated comprising a fiber nut housing assembly 12, a connecting member in the form of a threaded coupling 14, a main ferrule 16, and an inner ferrule 18. Housing assembly 12 is a substantially solid body with inner walls forming axial bore 20 extending from one end of housing assembly 12 partway through the assembly. Axial bore 20 is defined by a first graduated inner wall 22, a longitudinally extending inner wall 24, and a hemispherical cavity 26 which terminates axial bore 20. Hemispherical cavity 26 includes an end wall 27 which serves as a spherical mirror by being coated with a reflective surface, such as a reflecting silver surface. Alternatively, an integral spherical mirror (not shown) may be inserted snugly into cavity 26 so that it abuts against the end wall 27.

Housing assembly 12 and threaded coupling 14 interengage by means of the illustrated set of mating threads 28. The two parts are screwed together until the end walls 30 and 32 abut against each other. Alternatively, housing assembly 12 may be caused to mate with a coupling by means of a known bayonet locking mechanism (not shown). Coupling 14 includes an inwardly directed annular flange 34 at an end 35 away from housing assembly 12. An axial bore 36 extends through threaded coupling 14 and aligns with axial bore 20 of housing assembly 12. As illustrated in FIG. 1, axial bore 36 includes different sections 36a and 36b of different diameters as well as the set of mating threads 28. Axial bores 20 and 36 are dimensioned to receive main ferrule 16 therein.

The main ferrule 16 comprises a cylindrical main body portion 38 and a tapered nose portion 40 which terminates in a tip 42. An axial bore 44 extends through main ferrule 16. Axial bore 44 roughly follows the outer contour of main ferrule 16, being wider in main body portion 38, and narrowing at nose portion 40 and tip 42. Axial bore 44 terminates in an aperture 46 at the end of main ferrule 16. An outwardly extending flange 48 of cylindrical cross section is disposed on the outer periphery of main ferrule 16 behind nose portion 40. When main ferrule 16 is disposed in axial bores 36 and 20 of threaded coupling 12 and housing assembly 14, and when these two parts are interengaged by means of mating threads 28, flange 48 becomes sandwiched between annular flange 34 and an end wall 50 of housing assembly 12. This fixes the distance from the tip 42 to the spherical reflecting surface 27 and ensures that aperture 46 is located in the 1:1 imaging plane of spherical reflecting surface 27. At the same time, the taper of nose portion 40 is not the same as the taper of inner wall 22 of housing assembly 12. Thus, as housing assembly 12 is interengaged with threaded coupling 14, main ferrule 16 becomes jam fit into the axial bore 20 of housing assembly 12. Because of this jam fitting, there is no sideways movement of main ferrule 16 in a direction parallel to the 1:1 imaging plane.

The inner ferrule 18 is similar in overall shape to main ferrule 16 but without an outwardly extending flange. Inner ferrule 18 includes a cylindrical main body portion 50, a tapered nose portion 52 and a tip 54. An axial bore 56 which generally follows the outer contour runs through inner ferrule 18 terminating in an aperture 58 at the end of tip 54. Inner ferrule 18 is received within the axial bore 44 of main ferrule 16 until the tip 54 jams against the tapered inner wall 57 of axial bore 44. This ensures that aperture 58 is spaced at a distance from aperture 46 of main ferrule 16.

To assemble the connector 10, one starts with main ferrule 16 and inner ferrule 18 separated from housing assembly 12 and threaded coupling 14. A fast setting adhesive is injected inside axial bore 44 of main ferrule 16 near its tip 42. Inner ferrule 18 is inserted into axial bore 44 of main ferrule 16 and brought into jam fit engagement therewith by pressing until tip 54 is forced against the tapered inner wall of axial bore 44. This leaves aperture 58 spaced at a distance from aperture 46 with the adhesive filling the gap therebetween. Next, optical fibers 60 and 62, stripped of their shielding and cladding, are threaded from the rear, first through axial bore 56 of inner ferrule 18, emerging from aperture 58, and then through axial bore 44 of main ferrule 16, emerging through aperture 46. The adhesive is allowed to cure thus fixing side-by-side optical fibers 60 and 62 into place with minimal skewing.

Optical fibers 60 and 62 extending out of aperture 46 are next cut and polished by means known to persons skilled in the art. For example, threaded coupling 14, previously mounted onto the shielded cable formed by the fibers 60 and 62, is brought forward and into engagement with the disposable polishing wheel described in U.S. Pat. No. 4,614,402. Thereafter, the optical fibers 60 and 62 are scribed and the end surfaces polished as described in U.S. Pat. No. 4,614,402 (which is incorporated herein by reference) so that the polished end surfaces of fibers 60 and 62 terminate at aperture 46 of main ferrule 16. The polishing wheel is then disconnected from threaded coupling 14.

Once optical fibers 60 and 62 have been fixed into place inside main ferrule 16 and inner ferrule 18 and the end surfaces of the fibers polished, the fiber nut connector 10 may be fully assembled by bringing the polished end surfaces terminating at aperture 46 into position opposite spherical reflecting surface 27. Housing assembly 12 is brought into engagement with threaded coupling 14 and the two are screwed together by means of threads 28. As the two parts are screwed together, flange 34 of coupling 14 presses against flange 48 of main ferrule 16 and brings it into axial bore 20 of housing assembly 12. This continues until end walls 30 and 32 abut against each other. At this point, fiber nut connector 10 becomes fully assembled, as shown in FIGS. 1 and 4, with annular flange 48 sandwiched between flange 34 of coupling 14 and wall 50 of housing assembly 12. At the same time, nose portion 40 of main ferrule 16 has been jam-fitted against the tapered inner walls of housing assembly 12, and the polished end surfaces of optical fibers 60 and 62 located at aperture 46 come to rest at the 1:1 imaging plane of spherical reflecting surface 27.

Figure 2:
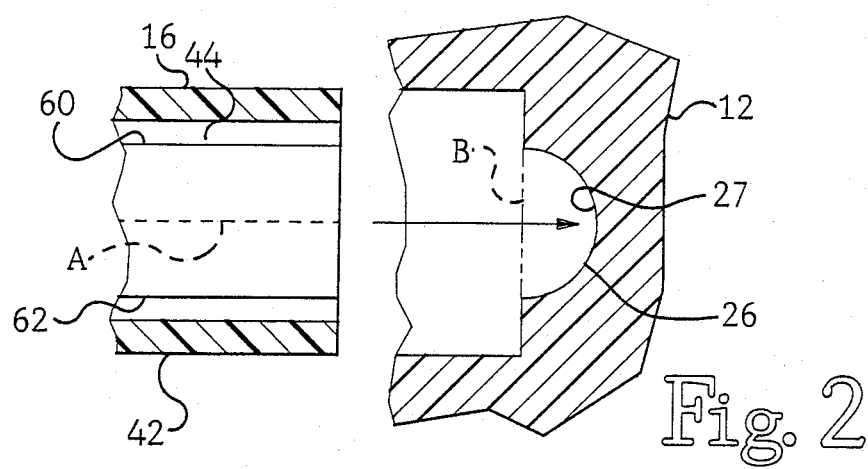
FIG. 2 is an enlarged cross-sectional view showing the main ferrule about to be brought into position opposite the spherical mirror.
Figure 3:
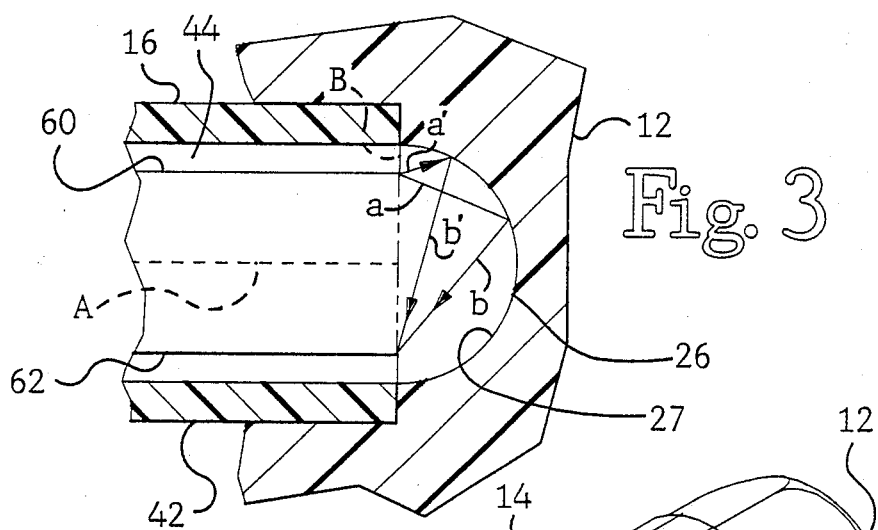
FIG. 3 is similar to FIG. 2 after the ferrule has been placed into position.

FIGS. 2 and 3 illustrate the main ferrule 16 being brought into final position in housing assembly 12. The optical fibers 60 and 62 are positioned symmetrically with respect to the optical axis A. When the final position is reached, the end surfaces of optical fibers 60 and 62 are precisely located in the 1:1 imaging plane B. FIG. 3 illustrates how two different incident light rays a and a' are emitted by optical fiber 60, impinge on the spherical reflecting surface 27, and are precisely reflected back as light rays b and b' into optical fiber 62, thus optically coupling the two side-by-side optical fibers.

Referring now to FIG. 4, a perspective view of a fully assembled optical fiber nut connector 10 according to the present invention is shown. FIG. 4 illustrates housing assembly 12 interengaged with threaded coupling 14 and with the nested main ferrule 16 and inner ferrule 18 emerging from axial bore 36 of threaded coupling 14. Also illustrated are the gripping surfaces provided on housing assembly 12 and threaded coupling 14 which aid in their being threaded together. While no particular outer contour is required for housing assembly 12 and threaded coupling 14, providing such gripping surfaces is helpful for field assembly of the connector as no special tools are required. When completed, the connected fibers may be coiled in a loop and stored in a standard electrical box. Housing assembly 12, threaded coupling 14, main ferrule 16, and inner ferrule 18 may all be made from machined metal parts, or, preferably, from plastic.

While the invention has been described by reference to a specific embodiment, this was for purposes of illustration only. Numerous alternative embodiments are also possible within the spirit of the invention.

I claim:

1. A connector for multiple optical fibers, comprising:
    at least two optical fibers side by side within a first ferrule and a main ferrule,
    the optical fibers being supported within a corresponding tip of the first ferrule and within a corresponding tip of the main ferrule,
    the corresponding tips supporting the optical fibers being at locations spaced apart along the lengths of the optical fibers to support the optical fibers without skewing,
    the tip of the first ferrule being fit within the main ferrule to support the optical fibers,
    housing assembly means supporting a reflector,
    coupling means on the main ferrule and on the housing assembly means for disconnectably coupling the main ferrule with the housing assembly means, and
    positioning means on the housing assembly means for disconnectably positioning the tip of the main ferrule at an imaging plane of the reflector upon coupling the main ferrule with the housing assembly means.
2. A connector as recited in claim 1, comprising:
    the main ferrule is jam fit in the housing assembly means and is restrained from movement parallel to the imaging plane.
3. A connector as recited in claim 2, comprising:
    the imaging plane is displaced from a center of curvature of the reflector.
4. A connector as recited in claim 2, comprising:
    the housing assembly means includes a bore with tapered inner walls receiving a corresponding portion of the main ferrule in said jam fit, and the reflector is in the bore.
5. A connector as recited in claim 1, comprising:
    the imaging plane is displaced from a center of curvature of the reflector.
6. A connector as recited in claim 5, comprising:
    the housing assembly means includes a bore with tapered inner walls receiving a corresponding portion of the main ferrule in said jam fit, and the reflector is in the bore.
7. A connector as recited in claim 1, comprising:
    the housing assembly means includes a bore with tapered inner walls receiving a corresponding portion of the main ferrule in said jam fit, and the reflector is in the bore.

* * * * *